US010616316B2

(12) United States Patent
Fawcett

(10) Patent No.: US 10,616,316 B2
(45) Date of Patent: Apr. 7, 2020

(54) PROCESSING ELEMENT HOST MANAGEMENT IN A STREAM COMPUTING ENVIRONMENT

(71) Applicant: International Business Machines Corporation, Armonk, NY (US)

(72) Inventor: Bradley W. Fawcett, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 15/267,074

(22) Filed: Sep. 15, 2016

(65) Prior Publication Data

US 2018/0077214 A1 Mar. 15, 2018

(51) Int. Cl.
*H04L 29/08* (2006.01)
*G06F 16/2455* (2019.01)
*H04L 29/06* (2006.01)
*G06F 9/00* (2006.01)
*G06F 9/50* (2006.01)

(52) U.S. Cl.
CPC ........ *H04L 67/1008* (2013.01); *G06F 9/5066* (2013.01); *G06F 16/24568* (2019.01); *H04L 67/10* (2013.01); *H04L 67/1012* (2013.01); *H04L 67/1023* (2013.01); *G06F 9/00* (2013.01); *H04L 65/4069* (2013.01); *H04L 65/604* (2013.01); *H04L 67/1002* (2013.01)

(58) Field of Classification Search
CPC ............. G06F 17/30516; G06F 3/0484; G06F 9/30007; G06F 9/5027–5055; G06F 16/24568; H04L 67/1008; H04L 67/1012; H04L 67/1023; H04L 67/10
See application file for complete search history.

(56) References Cited

U.S. PATENT DOCUMENTS 5,640,586 A * 6/1997 Pechanek ............ G06F 15/8023
706/42
7,904,848 B2 * 3/2011 Coene .................. G06F 9/5066
716/111
8,849,888 B2 9/2014 Fawcett
(Continued)

OTHER PUBLICATIONS

International Business Machines Corporation; "IBM InfoSphere Streams Version 4.1.1: Operators: spl 1.2.1"; <http://www.ibm.com/support/knowledgecenter/SSCRJU_4.1.1/com.ibm.streams.toolkits.doc/spldoc/dita/tk$spl/ix$Operator.html>.
(Continued)

*Primary Examiner* — Gregory G Todd
(74) *Attorney, Agent, or Firm* — Rakesh Roy

(57) ABSTRACT

Disclosed aspects relate to processing element host management in a stream computing environment having a pool of compute nodes to host a set of processing elements. A set of processing element placement criteria may be identified for the pool of compute nodes with respect to processing element placement on the pool of compute nodes. A set of processing element profile data may be detected for the set of processing elements with respect to processing element placement on the pool of compute nodes. By comparing the set of processing element profile data and the set of processing element placement criteria, a placement arrangement for the set of processing elements on the pool of compute nodes may be determined. Based on the placement arrangement, the set of processing elements may be established on the pool of compute nodes.

16 Claims, 9 Drawing Sheets

(56) References Cited

U.S. PATENT DOCUMENTS

| | | | |
|---|---|---|---|
| 8,868,963 | B2 | 10/2014 | Fawcett |
| 9,569,221 | B1* | 2/2017 | Chaudhri .............. G06F 9/3851 |
| 10,122,788 | B2* | 11/2018 | Ghare ................ H04L 65/4069 |
| 2002/0174318 | A1 | 11/2002 | Stuttard et al. |
| 2008/0005392 | A1* | 1/2008 | Amini .............. H04L 29/06027 710/29 |
| 2009/0007116 | A1* | 1/2009 | Duffy ................ G06F 16/24532 718/100 |
| 2012/0324453 | A1* | 12/2012 | Chandramouli .. G06F 16/24568 718/100 |
| 2013/0145034 | A1 | 6/2013 | Fawcett |
| 2013/0145203 | A1* | 6/2013 | Fawcett ............. G06F 9/30007 714/3 |
| 2014/0115596 | A1 | 4/2014 | Khan et al. |
| 2016/0085810 | A1 | 3/2016 | de Castro Alves et al. |
| 2016/0110228 | A1 | 4/2016 | Zhang |
| 2017/0083199 | A1 | 3/2017 | Barsness et al. |
| 2017/0091305 | A1* | 3/2017 | Cao ....................... G06F 16/285 |
| 2019/0065249 | A1 | 2/2019 | Cheng et al. |

OTHER PUBLICATIONS

Feldman et al.; "Label Based Scheduling"; <https://issues.apache.org/jira/secure/attachment/12654148/LabelBasedScheduling.pdf>.

Tan et al.; "YARN-796: Node-labels—Requirements & Design doc—V1"; <https://issues.apache.org/jira/secure/attachment/12654446/Node-labels-Requirements-Design-doc-V1.pdf>; Jul. 7, 2014.

IBM, "List of IBM Patents or Patent Applications Treated as Related (Appendix P)," Apr. 4, 2018, p. 1-2.

Fawcett, "Processing Element Host Management in a Stream Computing Environment," Application and Drawings, filed Dec. 27, 2017, 67 pages, U.S. Appl. No. 15/855,822.

* cited by examiner

Table 910    900

- PE#1 may not have any placement criteria
- PE#2 must be placed on a host with "red" tag
- PE#3 must be placed on a host with "red" and "blue" tags Table 930

| Tag ID | Tag type |
|---|---|
| "red" | Regular |
| "blue" | Invitation - Only |
| "white" | regular |

Table 950

| Host ID | Tags |
|---|---|
| Host#A | "red" |
| Host#B | "red", "blue" |
| Host#C | "red", "blue", "white" |
| Host#D | -- no tags specified -- |

Table 970

| Hostpool | Tagging requirements | Hosts in pool |
|---|---|---|
| Pe#1's hostpool | --none-- | Host#A, Host#D<br><br>Note: Host#B & Host#C have been removed due to specifying "blue" Invitation-only host tag. |
| Pe#2's hostpool | "red" | Host#A<br><br>Note: Host#B & Host#C have been removed due to specifying "blue" Invitation-only host tag. |
| Pe#3's hostpool | "red", "blue" | Host#B, Host#C |

FIG. 9

PROCESSING ELEMENT HOST MANAGEMENT IN A STREAM COMPUTING ENVIRONMENT

BACKGROUND

This disclosure relates generally to computer systems and, more particularly, relates to processing element host management in a stream computing environment. The amount of stream computing data that needs to be managed by enterprises is increasing. Management of stream computing environments may be desired to be performed as efficiently as possible. As stream computing data needing to be managed increases, the need for efficient processing element management in a stream computing environment may increase.

SUMMARY

Aspects of the disclosure relate to processing element host management in a stream computing environment. Host placement for processing elements may be determined based on invitation-only host tags. In order for a host to allow a certain processing element to be placed on it, the processing element may share a particular attribute with the host. A set of processing elements may be analyzed to determine characteristics that affect the hosts that the set of processing elements may be deployed to. A pool of candidate host compute nodes may also be evaluated to identify a host system configuration that indicates which processing elements are eligible for placement on which compute nodes. A comparison of the characteristics of the processing elements and the system configuration of the pool of compute nodes may be performed to determine a placement configuration for the set of processing elements on the pool of candidate host compute nodes. As such, placement of processing elements on hosts that correspond to the type and function of the processing elements may be facilitated.

Disclosed aspects relate to processing element host management in a stream computing environment having a pool of compute nodes to host a set of processing elements. A set of processing element placement criteria may be identified for the pool of compute nodes with respect to processing element placement on the pool of compute nodes. A set of processing element profile data may be detected for the set of processing elements with respect to processing element placement on the pool of compute nodes. By comparing the set of processing element profile data and the set of processing element placement criteria, a placement arrangement for the set of processing elements on the pool of compute nodes may be determined. Based on the placement arrangement, the set of processing elements may be established on the pool of compute nodes.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 9 is a diagram illustrating an example system for processing element host management in a stream computing environment, according to embodiments.

Figure 1:
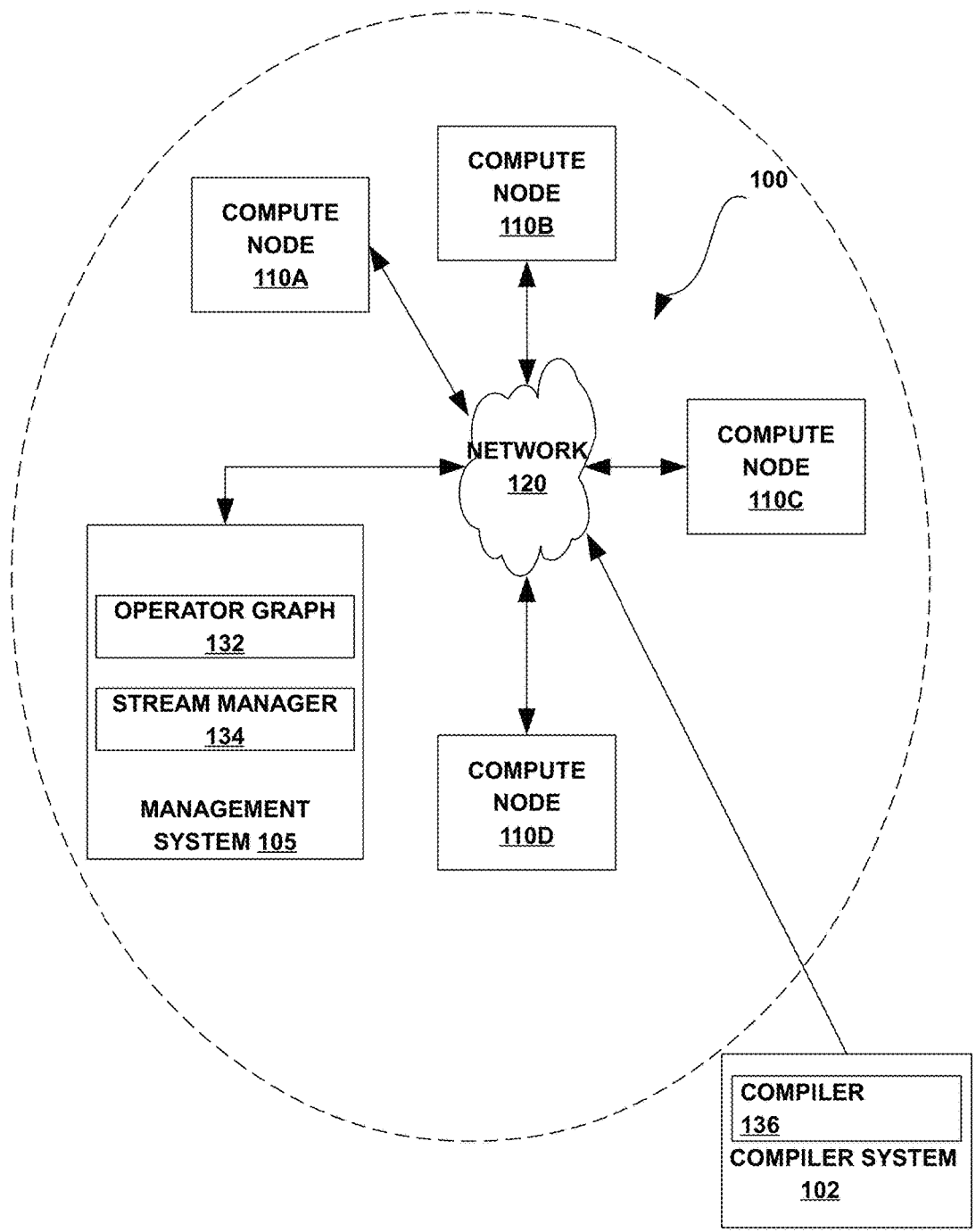
FIG. 1 illustrates an exemplary computing infrastructure to execute a stream computing application according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to processing element host management in a stream computing environment. Host placement for processing elements may be determined based on invitation-only host tags. In order for a host (e.g., compute node) to allow a certain processing element to be placed on it, the processing element may be required to share a particular attribute (e.g., type, function) with the host. A set of processing elements may be analyzed (e.g., by a runtime platform scheduler) to determine characteristics (e.g., processing element profile data) that affect the hosts that the set of processing elements may be deployed to. A pool of candidate host compute nodes may also be evaluated to identify a host system configuration (e.g., placement criteria) that indicates which processing elements are eligible for placement on which compute nodes. A comparison of the characteristics of the processing elements and the system configuration of the pool of compute nodes may be performed to determine a placement configuration for the set of processing elements on the pool of candidate host compute nodes. In this way, placement of processing elements on hosts that correspond to the type and function of the processing elements may be facilitated. Leveraging processing element host management may be associated with benefits including data processing efficiency and stream application performance.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

A streams processing job has a directed graph of processing elements that send data tuples between the processing elements. The processing element operates on the incoming tuples, and produces output tuples. A processing element has an independent processing unit and runs on a host. The streams platform can be made up of a collection of hosts that are eligible for processing elements to be placed upon. When a job is submitted to the streams run-time, the platform scheduler processes the placement constraints on the processing elements, and then determines (the best) one of these candidates host for (all) the processing elements in that job, and schedules them for execution on the decided host.

Aspects of the disclosure include a method, system, and computer program product for processing element host management in a stream computing environment having a pool of compute nodes to host a set of processing elements. A set of processing element placement criteria for the pool of compute nodes with respect to processing element placement on the pool of compute nodes may be identified. A set of processing element profile data for the set of processing elements with respect to processing element placement on the pool of compute nodes may be detected. By comparing the set of processing element profile data and the set of processing element placement criteria, a placement arrangement for the set of processing elements on the pool of computing nodes may be determined. Based on the placement arrangement, the set of processing elements on the pool of compute nodes may be established.

In embodiments, a first subset of the set of processing element profile data for a first processing element of the set of processing elements that does not achieve a first subset of the set of processing element placement criteria for a first compute node of the set of compute nodes may be resolved, and assignment of the first processing element to the first compute node may be prevented. In embodiments, a first subset of the set of processing element profile data for a first processing element of the set of processing elements that achieves a first subset of the set of processing element placement criteria for a first compute node of the pool of compute nodes may be resolved, and the first processing element may be allocated to the first compute node. In embodiments, the first subset of the set of processing element profile data for the first processing element of the set of processing elements that achieves a second subset of the set of processing element placement criteria for a second compute node of the pool of compute nodes may be resolved, and the first processing element may be allocated to the second compute node.

In embodiments, the set of processing element placement criteria may be based on a target processing element type. An assignment of a subset of the set of processing elements that have a set of processing element profile data which corresponds to the target processing element type may be prioritized to a subpool of the pool of compute nodes that corresponds to the set of processing element placement criteria. The subset of the set of processing elements that have a set of processing element profile data which corresponds to the target processing element type may be isolated on the subpool of the pool of compute nodes separate from other processing elements. In embodiments, the set of processing element profile data may be configured without modifying a streaming application source code. In embodiments, the set of processing element placement criteria may be configured without modifying a streaming application source code. In embodiments, the placement arrangement may be redetermined in response to configuring the set of processing element placement criteria.

In embodiments, the set of processing element placement criteria may include a set of processing element qualification data. The set of processing element qualification data may include a set of invitation-only host tags, the set of processing element profile data may include a set of tagging criteria, and comparing the set of processing element profile data and the set of processing element placement criteria may include comparing the set of tagging criteria and the set of invitation-only host tags. In embodiments, a first processing element of the set of processing elements may be allocated to a first compute node of the pool of compute nodes only when a first tagging criterion of the set of tagging criteria matches a first invitation-only host tag of the set of invitation-only host tags. In embodiments, assignment of a second processing element of the set of processing elements to a second compute node of the pool of compute nodes may be prevented when a second tagging criterion of the set of tagging criteria mismatches a second invitation-only host tag of the set of invitation-only host tags.

In embodiments, the set of invitation-only host tags may be based on a target processing element type. An assignment of a subset of the set of processing elements that have a set of tagging criteria which matches the target processing element type may be prioritized to a subpool of the pool of compute nodes that corresponds to the set of invitation-only host tags. The subset of the set of processing elements that have the set of tagging criteria which matches the target processing element type may be isolated on the subpool of the pool of compute nodes separate from other processing elements. In embodiments, each invitation-only host tag of the set of invitation-only host tags may match at least one tagging criterion of the set of tagging criteria. The set of tagging criteria may be configured without modifying a streaming application source code. In embodiments, the set of invitation-only host tags may be configured without modifying a streaming application source code. In embodiments, the placement arrangement may be redetermined in an automated fashion without user intervention in response to configuring the set of invitation-only host tags. Altogether, aspects of the disclosure can have performance or efficiency benefits (e.g., wear-rate, service-length, reliability, speed, flexibility, load balancing, responsiveness, stability, high availability, resource usage, productivity). Aspects may save resources such as bandwidth, disk, processing, or memory.

FIG. 1 illustrates one exemplary computing infrastructure 100 that may be configured to execute a stream computing application, according to some embodiments. The computing infrastructure 100 includes a management system 105 and two or more compute nodes 110A-110D—i.e., hosts—which are communicatively coupled to each other using one or more communications networks 120. The communications network 120 may include one or more servers, networks, or databases, and may use a particular communication protocol to transfer data between the compute nodes 110A-110D. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
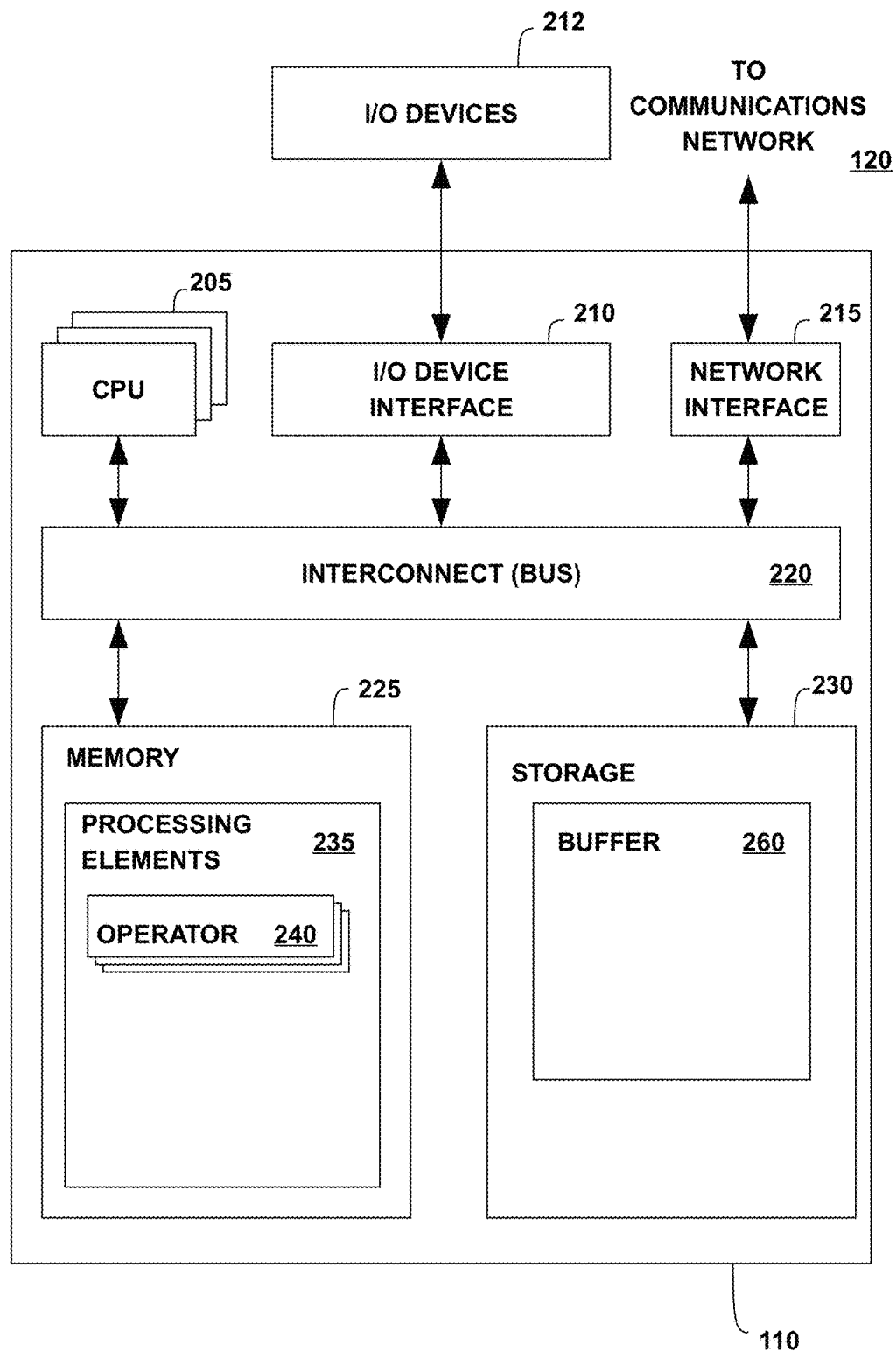
FIG. 2 illustrates a view of a compute node according to embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. Although shown as being in storage, the buffer 260 may be located in the memory 225 of the compute node 110 or in a combination of both memories. Moreover, storage 230 may include storage space that is external to the compute node 110, such as in a cloud.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

Figure 3:
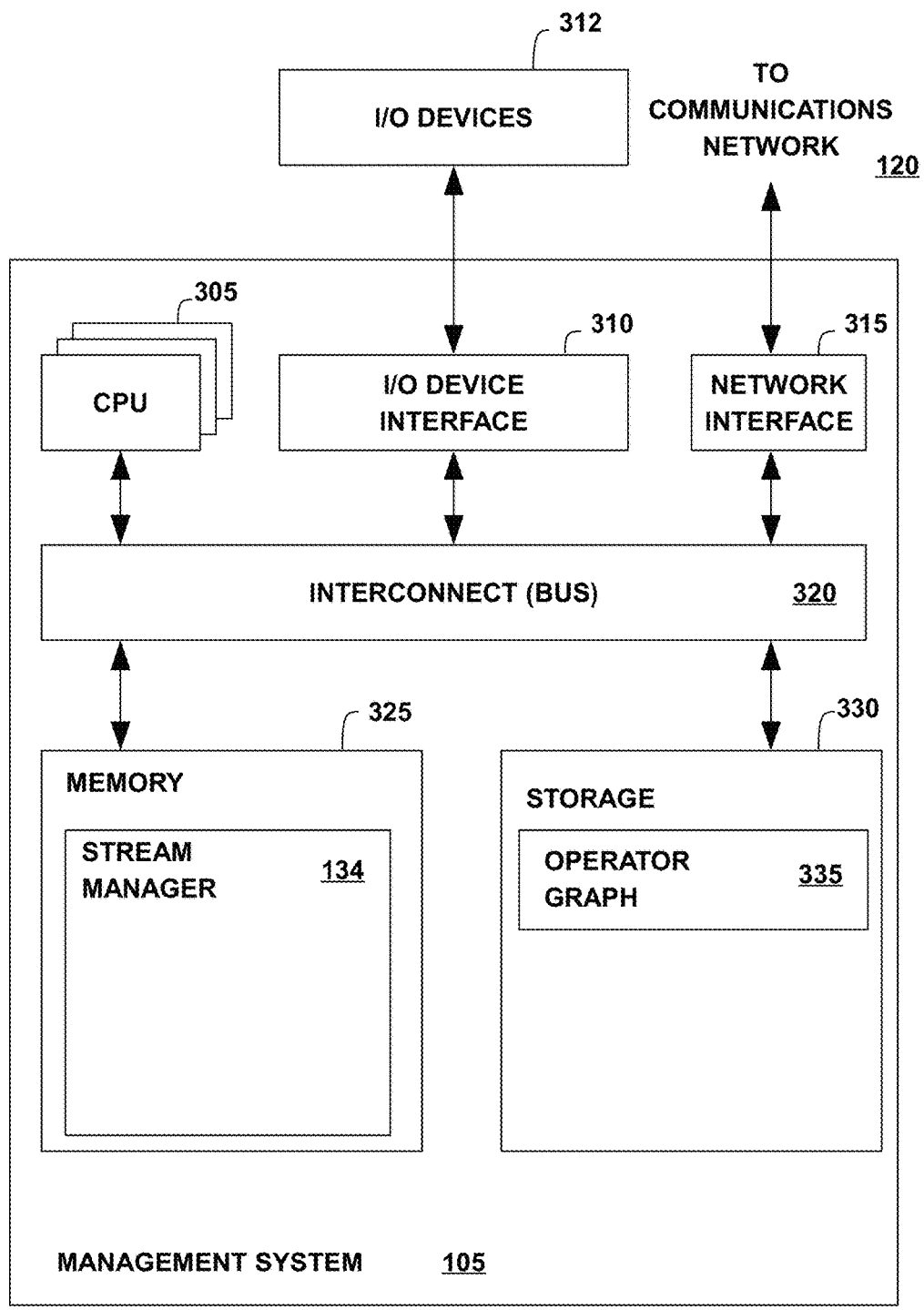
FIG. 3 illustrates a view of a management system according to embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing or stored in memory 325 (e.g., completely in embodiments, partially in embodiments).

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
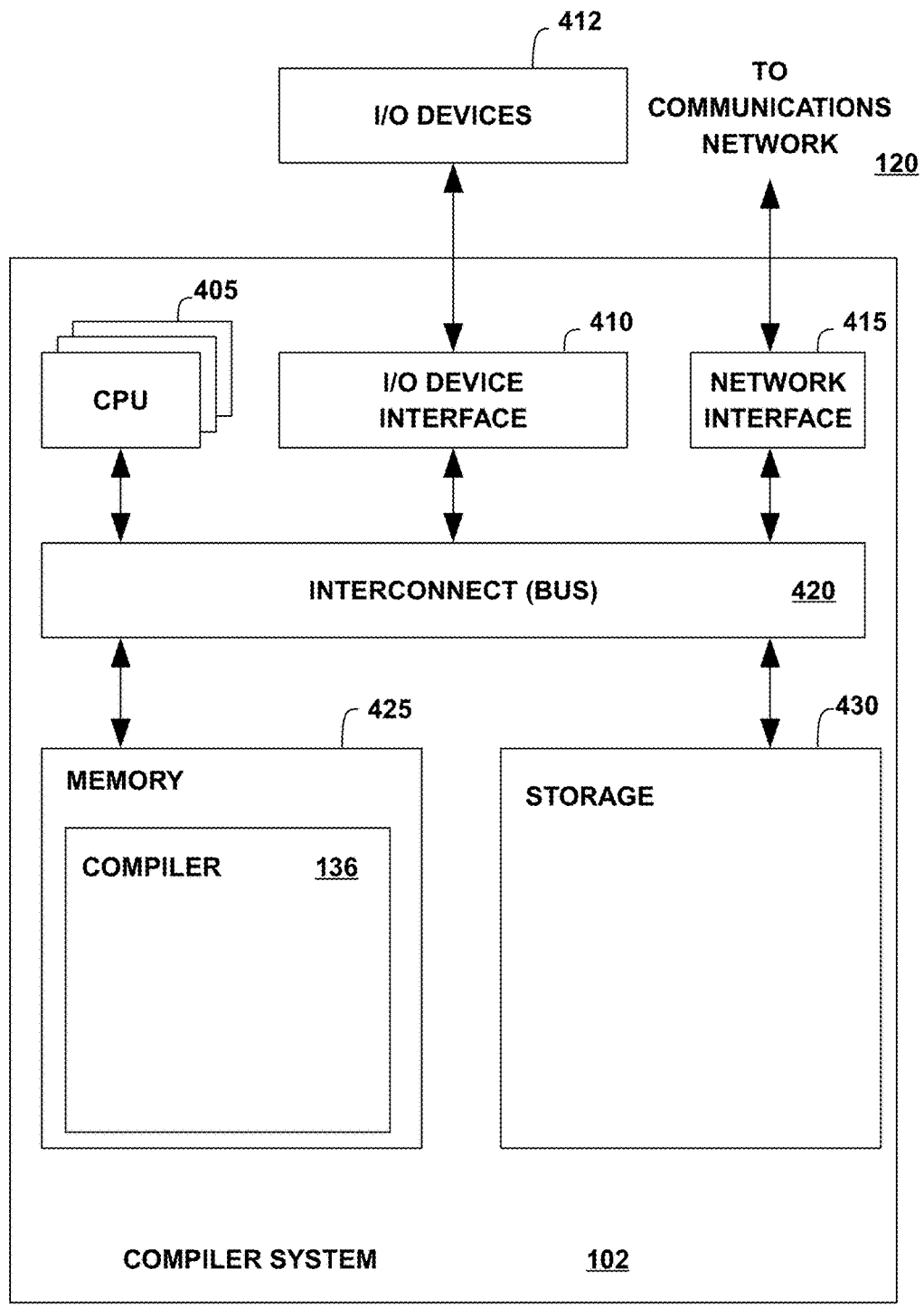
FIG. 4 illustrates a view of a compiler system according to embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both. The output of the compiler 136 may be represented by an operator graph, e.g., the operator graph 335.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5:
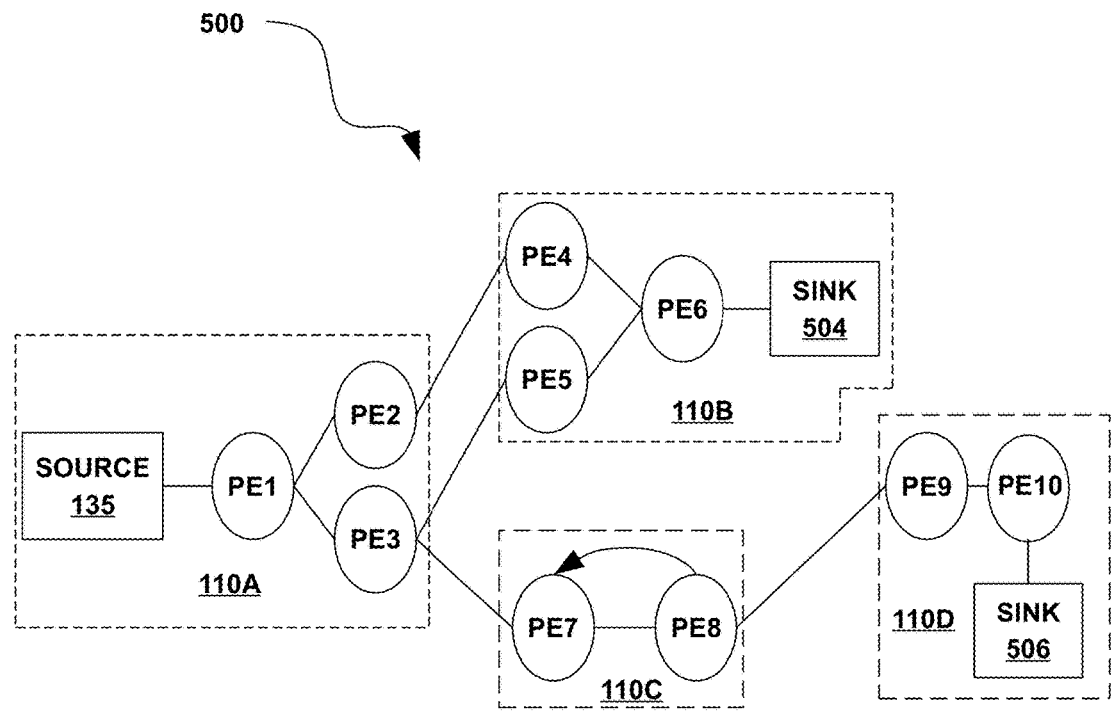
FIG. 5 illustrates an exemplary operator graph for a stream computing application according to embodiments.

FIG. 5 illustrates an exemplary operator graph 500 for a stream computing application beginning from one or more sources 135 through to one or more sinks 504, 506, according to some embodiments. This flow from source to sink may also be generally referred to herein as an execution path. In addition, a flow from one processing element to another may be referred to as an execution path in various contexts. Although FIG. 5 is abstracted to show connected processing elements PE1-PE10, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIG. 5 includes ten processing elements (labeled as PE1-PE10) running on the compute nodes 110A-110D. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 135 and ends at a sink 504, 506. Compute node 110A includes the processing elements PE1, PE2, and PE3. Source 135 flows into the processing element PE1, which in turn outputs tuples that are received by PE2 and PE3. For example, PE1 may split data attributes received in a tuple and pass some data attributes in a new tuple to PE2, while passing other data attributes in another new tuple to PE3. As a second example, PE1 may pass some received tuples to PE2 while passing other tuples to PE3. Tuples that flow to PE2 are processed by the stream operators contained in PE2, and the resulting tuples are then output to PE4 on compute node 110B. Likewise, the tuples output by PE4 flow to operator sink PE6 504. Similarly, tuples flowing from PE3 to PE5 also reach the operators in sink PE6 504. Thus, in addition to being a sink for this example operator graph, PE6 could be configured to perform a join operation, combining tuples received from PE4 and PE5. This example operator graph also shows tuples flowing from PE3 to PE7 on compute node 110C, which itself shows tuples flowing to PE8 and looping back to PE7. Tuples output from PE8 flow to PE9 on compute node 110D, which in turn outputs tuples to be processed by operators in a sink processing element, for example PE10 506.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

The stream manager 134 of FIG. 1 may be configured to monitor a stream computing application running on compute nodes, e.g., compute nodes 110A-110D, as well as to change the deployment of an operator graph, e.g., operator graph 132. The stream manager 134 may move processing elements from one compute node 110 to another, for example, to manage the processing loads of the compute nodes 110A-110D in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110D.

Because a processing element may be a collection of fused stream operators, it is equally correct to describe the operator graph as one or more execution paths between specific stream operators, which may include execution paths to different stream operators within the same processing element. FIG. 5 illustrates execution paths between processing elements for the sake of clarity.

Figure 6:
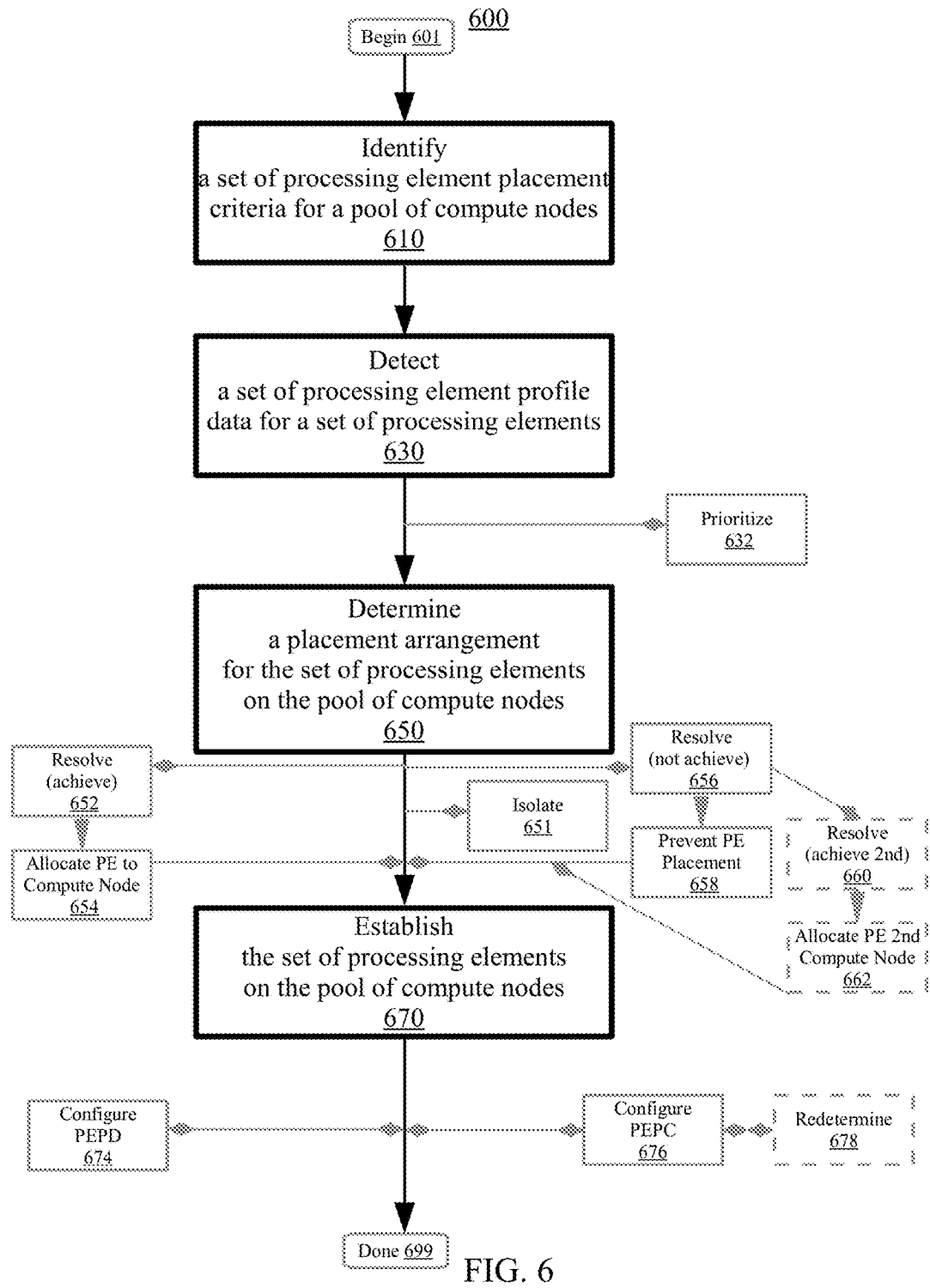
FIG. 6 is a flowchart illustrating a method for processing element host management in a stream computing environment having a pool of compute nodes to host a set of processing elements, according to embodiments.

FIG. 6 is a flowchart illustrating a method 600 for processing element host management in a stream computing environment having a pool of compute nodes to host a set of processing elements. The pool of compute nodes may include one or more types of data communication devices configured to create, receive, and transmit information over a communications channel of a network. In embodiments, the pool of compute nodes may be configured to host the set of processing elements. The set of processing elements may include one or more stream operators configured to perform operations (e.g., logic-based analysis, attribute modification) on data (e.g., tuples) as part of a stream computing application. The set of processing elements may operate on incoming tuples to produce output tuples. In embodiments, the placement (e.g., deployment) of processing elements on hosts may impact the performance, resource availability, and other characteristics of the host computing environment. Aspects of the disclosure relate to the recognition that, in some situations, it may be desirable to limit the processing elements that may be placed on a particular host to those processing elements that share one or more attributes (e.g., perform similar operations, corresponding processing element type) with the host. Accordingly, aspects of method 600 relate to determining and establishing a placement arrangement for a set of processing elements on a pool of compute nodes based on both a set of processing element placement criteria and a set of processing element profile data. Leveraging processing element host management may be associated with benefits including data processing efficiency and stream application performance. The method 600 may begin at block 601.

At block 610, a set of processing element placement criteria may be identified. The set of processing element placement criteria may be identified for the pool of compute nodes with respect to processing element placement on the pool of compute nodes. Generally, identifying can include receiving, collecting, or ascertaining the set of processing element placement criteria. The set of processing element placement criteria may include requirements, prerequisites, stipulations, and other factors that specify what kind of processing elements may be placed on the pool of compute nodes. As an example, the set of processing element placement criteria may designate a particular processing element type (e.g., join type), function (e.g., ingest), resource usage level (e.g., less than 8% of total memory resources), security characteristic (e.g., high compliance level, low compliance level), or other factor that influences which processing elements may be deployed to the pool of compute nodes. In embodiments, identifying the set of processing element placement criteria may include analyzing a set of system properties (e.g., system resources, usage history data) of the pool of compute nodes, and ascertaining factors that affect the placement of processing elements on the pool of compute nodes. In certain embodiments, identifying the set of processing element placement criteria may include receiving (e.g., by one or more compute nodes of the pool of compute nodes) a selection or input of an administrator/user that specifies the set of processing element placement criteria. Other methods of identifying the set of processing element placement criteria are also possible.

Consider the following example. The stream computing environment may include a runtime platform scheduler configured to facilitate placement of the set of processing elements. The runtime platform scheduler may analyze the system resources and usage history data of the pool of compute nodes in order to identify the set of processing element placement criteria. In embodiments, the runtime platform scheduler may ascertain that a first compute node of the pool of compute nodes has a substantially large amount of available memory resources. In certain embodiments, aspects of the disclosure relate to the recognition that a large amount of available memory resources may be desirable for "join" type processing elements (e.g., larger amounts of memory may enable increased operator window sizes, facilitating tuple join and matching operations). Accordingly, based on the available system resources of the first compute node, the runtime platform scheduler may determine (e.g., assign) a processing element placement criterion of "Join-Type Processing Elements" for the first compute node. Other methods of identifying the set of processing element placement criteria are also possible.

At block 630, a set of processing element profile data for the set of processing elements may be detected. The set of processing element profile data may be detected for the set of processing elements with respect to processing element placement on the pool of compute nodes. Generally, detecting can include sensing, receiving, discovering, recognizing, finding, or acquiring the set of processing element profile data for the set of processing elements. The set of processing element profile data may include information that describes the function, type, resource usage statistics, security properties, performance characteristics, and other attributes of the set of processing elements. As an example, the set of processing element profile data may specify that a first processing element is a "Sort" type operator that categorizes tuples, requires between 1 and 2 gigabytes of memory to operate, and has a maximum tuple throughput rate of 800 tuples per second. In embodiments, detecting the set of processing element profile data may include accessing an archive of historical usage data for the set of processing elements, and analyzing the usage statistics of one or more processing elements in order to ascertain what type of functions the processing element performs, the type of streaming applications it has been used in, and other profile data for the processing element. In certain embodiments, detecting the set of processing element profile data may include making use of a profile for a particular processing element that includes data regarding the function and usage history of the particular processing element. Other methods of detecting the set of processing element profile data for the set of processing elements are also possible.

Consider the following example. The runtime platform scheduler of a stream computing environment may access a database of usage statistics for a stream application. The database of usage statistics may include records regarding the type of operations and functions performed, as well as the type and number of tuples processed by each processing element included in the stream application. The runtime platform scheduler may evaluate the usage statistics and performance characteristics for one or more processing elements, and extract the set of processing element profile data. In embodiments, the set of processing element profile data may be derived based on the usage statistics for a processing element. For instance, the database of usage statistics may indicate that the output tuples produced by a particular processing element are less than half the number of input tuples received by the operator. As such, it may be ascertained that the processing element is performing join operations (e.g., combining two or more input tuples into a single output tuple). Accordingly, processing element profile data that indicates a function of "Join" type may be detected for the processing element. Other methods of detecting the set of processing element profile data for the set of processing elements are also possible.

In embodiments, an assignment of a subset of the set of processing elements that have a set of processing element profile data which corresponds to a target processing element type may be prioritized at block 632. The assignment of the subset of the set of processing elements may be prioritized to a subpool of the pool of compute nodes that corresponds to the set of processing element placement criteria. Generally, prioritizing can include arranging, organizing, ordering, or weighting the assignment of the subset of the set of processing elements. Aspects of the disclosure relate to the recognition that, in embodiments, grouping processing elements that have similar processing element types (e.g., functions) on the same set of hosts may be associated with performance and efficiency benefits for the stream computing environment. Accordingly, aspects of the disclosure relate to reserving a subpool (e.g., subset, portion) of the pool of compute nodes to exclusively manage a target processing element type (e.g., particular processing element function such as ingest, join, sort).

In embodiments, prioritizing may include favoring placement of the subset of processing elements (e.g., processing elements associated with the target processing element type) on the subpool of compute nodes over processing elements associated with other processing element types. As an example, a first subpool of compute nodes may correspond to a processing element type of "sort." A first subset of processing elements associated with a processing element type of "functor," and a second subset of processing elements associated with a processing element type of "sort" may both be scheduled for placement on the pool of compute nodes. As described herein, a runtime platform scheduler may ascertain that the processing element type of the second subset of processing elements (e.g., sort) corresponds with the target processing element type of the first subpool of compute nodes, and prioritize placement of the second subset of processing elements on the first subpool of compute nodes in favor of the first subset of processing elements. Other methods of prioritizing the assignment of a subset of the set of processing elements are also possible.

At block 650, a placement arrangement for the set of processing elements on the pool of computing nodes may be determined. The placement arrangement for the set of processing elements may be determined by comparing the set of processing element profile data and the set of processing element placement criteria. Generally, determining can include computing, formulating, calculating, selecting, or ascertaining the placement arrangement for the set of processing elements. The placement arrangement may include an organization, distribution, allocation, or other plan for deployment of the set of processing elements. For example, the placement arrangement may specify which processing elements of the set of processing elements may be placed on which host compute nodes of the pool of computing nodes. As described herein, determining the placement arrangement may include comparing the set of processing element profile data and the set of processing element placement criteria. In embodiments, comparing may include evaluating the placement criteria (e.g., requirements, conditions for placement) for the pool of compute nodes with respect to the set of processing element profile data (e.g., properties and attributes of the processing elements) in order to determine a placement arrangement associated with positive impacts (e.g., stable performance, efficient resource usage) for the stream computing environment. For instance, the placement criteria of the pool of compute nodes may be juxtaposed with the profile data for the set of processing elements, and it may be ascertained whether the characteristics of one or more processing elements achieve the placement criteria (e.g., have a processing element type that corresponds to that specified by the pool of compute nodes). Accordingly, processing elements that achieve the placement criteria may be considered for placement on a corresponding compute node. Other methods of determining the placement arrangement for the set of processing elements are also possible.

In embodiments, a subset of the set of processing elements that have a set of processing element profile data which corresponds to a target processing element type may be isolated at block 651. The subset of the set of processing elements may be isolated on a subpool of the pool of compute nodes that corresponds to the set of processing element placement criteria. Generally, isolating can include separating, reserving, setting-aside, sequestering, or quarantining the subset of the set of processing nodes. As described herein, aspects of the disclosure relate to prioritizing placement of subsets of processing elements that have similar processing element types or functions (e.g., target processing element types) on the same set of hosts. In embodiments, the subset of processing elements may be isolated on the subpool of compute nodes to facilitate dedicated operation of a particular processing element function (e.g., data ingest). In embodiments, isolating may include assigning the subset of processing elements a particular partition or virtual machine as well as a dedicated resource allocation such that the subset of processing elements may operate independently of other processing elements in the stream computing environment. In embodiments, isolating may include configuring the subpool of compute nodes to only accept deployment of processing elements that are associated with the target processing element type, and facilitating placement of processing elements of the chosen type on the subpool of compute nodes. As an example, the set of processing element placement criterion may specify a target processing element type of "ingest." Accordingly, a runtime platform scheduler may evaluate the set of processing element profile data for a set of processing elements, and facilitate deployment of those target processing elements that are determined to correspond to the target processing element type of "ingest." Other methods of isolating the assignment of a subset of the set of processing elements are also possible.

In embodiments, it may be resolved that the first subset of the set of processing element profile data for the first processing element of the set of processing elements achieves a first subset of the set of processing element placement criteria for a first compute node of the pool of compute nodes at block 652. Generally, resolving can include ascertaining, deriving, formulating, or otherwise determining that a first subset of the set of processing element profile data achieves a first subset of the set of processing element placement criteria. In embodiments, resolving may include comparing the set of processing element profile data for the first processing element with the processing element placement criteria for a first compute node, and ascertaining that one or more aspects of the processing element profile data matches (e.g., corresponds with) one or more aspects of the processing element placement criteria for the first compute node. In embodiments, resolving may include evaluating the processing element profile data for the first processing element with respect to the processing element placement criteria for the first compute node and determining that the processing element profile data achieves a compatibility threshold with respect to the first compute node (e.g., compatibility score of 67 achieves a compatibility threshold of 60). Other methods of resolving that the first subset of the processing element profile data for the first processing element achieves a first subset of processing element placement criteria for a second compute node are also possible.

In embodiments, the first processing element may be allocated to the first compute node at block 654. The first processing element may be allocated to the first compute node in response to resolving that a first subset of processing element profile data for the first processing element achieves a second subset of processing element placement criteria for the first compute node. Generally, allocating can include assigning, placing, designating, or deploying the first processing element to the second compute node. In embodiments, allocating may include transferring assets for the first processing element from an original host device to the first compute node, and configuring the first compute node to operate the first processing element (e.g., assigning system hardware resources, network communication ports for use by the first processing element). In embodiments, allocating may include configuring a runtime platform scheduler to schedule deployment of the first processing element to the first compute node. Other methods of allocating the first processing element to the first compute node are also possible.

In embodiments, it may be resolved that a first subset of the set of processing element profile data for a first processing element of the set of processing elements does not achieve a first subset of the set of processing element placement criteria for a first compute node of the pool of compute nodes at block 656. Generally, resolving can include ascertaining, deriving, formulating, or otherwise determining that a first subset (e.g., portion of the processing element profile data) of the set of processing element profile data does not achieve a first subset (e.g., portion of the set of processing element placement criterion) of the set of processing element placement criteria. Aspects of the disclosure relate to the recognition that, in certain embodiments, one or more processing elements of the set of processing elements may not meet the requirements necessary for placement on a particular compute node of the pool of compute nodes.

In embodiments, resolving may include comparing the set of processing element profile data for a first processing element with the processing element placement criteria for a first compute node, and ascertaining that one or more aspects of the processing element profile data mismatches (e.g., conflicts, differs with) one or more aspects of the processing element placement criteria for the first compute node. As an example, the processing element placement criteria may specify that processing elements must be associated with a particular stream operation or processing element type (e.g., join, sort, ingest) in order to be placed on the first compute node. Accordingly, a processing element that is not associated with the specified operation or processing element type may be resolved to not achieve the processing element placement criteria. Other methods of resolving that a first subset of processing element profile data does not achieve a first subset of processing element placement criteria are also possible.

In embodiments, assignment of the first processing element to the first compute node may be prevented at block 658. In embodiments, preventing assignment of the first processing element to the first compute node may be performed in response to resolving that a first subset of processing element profile data for the first processing element does not achieve a first subset of processing element placement criteria. Generally, preventing can include limiting, denying, forbidding, or restricting assignment of the first processing element to the first compute node. In embodiments, preventing may include configuring a runtime platform scheduler to refrain from allocating the first processing element to the first compute node. As an example, in certain embodiments, preventing may include determining a placement arrangement for the set of processing elements on the pool of compute nodes that avoids placement of the first processing element on the first compute node. Other methods of preventing assignment of the first processing element to the first compute node are also possible.

In embodiments, it may be resolved that the first subset of the set of processing element profile data for the first processing element of the set of processing elements achieves a second subset of the set of processing element placement criteria for a second compute node of the pool of compute nodes at block 660. Generally, resolving can include ascertaining, deriving, formulating, or otherwise determining that a first subset of the set of processing element profile data achieves a second subset of the set of processing element placement criteria. Aspects of the disclosure relate to the recognition that, in embodiments, one or more processing elements that did not achieve the requirements necessary for placement on a first compute node of the pool of compute nodes may achieve the placement requirements for deployment on a second (e.g., different) compute node of the pool of compute nodes. In embodiments, resolving may include comparing the set of processing element profile data for a first processing element with the processing element placement criteria for a second compute node, and ascertaining that one or more aspects of the processing element profile data matches (e.g., corresponds with) one or more aspects of the processing element placement criteria for the second compute node. In embodiments, resolving may include determining that no aspect of the processing element profile data for the first processing element mismatches (e.g., conflicts with) the second subset of processing element placement criteria (e.g., all requirements of the second subset of processing element placement data are achieved by the first processing element). Other methods of resolving that the first subset of processing element profile data for the first processing element achieves a second subset of the set of processing element placement criteria for a second compute node are also possible.

In embodiments, the first processing element may be allocated to the second compute node at block 662. The first processing element may be allocated to the second compute node in response to resolving that a first subset of processing element profile data for the first processing element achieves a second subset of processing element placement criteria for a second compute node. Generally, allocating can include assigning, placing, designating, or deploying the first processing element to the second compute node. In embodiments, allocating may include transferring assets for the first processing element from an original host device to the second compute node, and configuring the second compute node to operate the first processing element (e.g., assigning system hardware resources, network communication ports for use by the first processing element). In embodiments, allocating may include configuring a runtime platform scheduler to schedule deployment of the first processing element to the second compute node. Other methods of allocating the first processing element to the second compute node are also possible.

Consider the following example. A pool of compute nodes may include a first compute node and a second compute node. The first compute node may have a first set of processing element placement criteria that indicates that only processing elements associated with "filter" operations (e.g., and no other operations) may be deployed to it. The second compute node may have a second set of processing element criterion that indicates that only processing elements that are at least associated with "filter" and "sort" operations may be deployed to it (e.g., processing elements associated with other operations are acceptable provided that "filter" and "sort" operations are also included). A runtime platform scheduler may receive a request to locate a host compute node for a first processing element associated with "filter," "sort," and "join" operations (e.g., as indicated by processing element profile data for the first processing element). The runtime platform scheduler may compare the processing element profile data for the first processing element with the first compute node, and resolve that the first processing element does not achieve the first set of placement criteria (e.g., the first compute node only accepts processing elements exclusively associated with "filter" operations). Accordingly, the first processing element may be prevented (e.g., blocked) from assignment to the first compute node. The runtime platform scheduler may proceed to compare the processing element profile data for the first processing element with the second compute node, and resolve that the first processing element achieves the second set of placement criteria (e.g., both the "filter" and "sort" operations are present, and additional operations are acceptable). Accordingly, the runtime platform scheduler may allocate the first processing element to the second compute node.

At block 670, the set of processing elements on the pool of compute nodes may be established. The set of processing elements may be established on the pool of compute nodes based on the placement arrangement. Generally, establishing can include deploying, placing, constructing, initiating deployment, configuring, compiling, assembling, organizing, introducing, or creating the placement arrangement. As described herein, aspects of the disclosure relate to using both a set of processing element placement criteria for a pool of compute nodes as well as a set of processing element profile data for a set of processing elements to determine a placement arrangement for a set of processing elements. In embodiments, establishing the placement arrangement may include configuring the pool of compute nodes to facilitate operation of one or more processing elements that are scheduled for placement, and deploying/transferring the one or more processing elements to corresponding compute nodes of the pool of compute nodes (e.g., as indicated by the placement arrangement). For instance, for a placement arrangement that specifies that a first processing element achieves the processing element placement criteria of a first compute node of the pool of compute nodes, a runtime platform scheduler may be configured to prepare the first compute node for reception of the first processing element (e.g., allocating system resources for usage by the first processing element) and migrate the processing element to the first compute node. Other methods of establishing the placement arrangement are also possible.

Consider the following example. In embodiments, a set of processing element placement criteria may be identified (e.g., a request received from a user, network administrator, client). The set of processing element placement criteria may include instructions to reserve a subpool of the pool of compute nodes for exclusive performance of "join" operations (e.g., it may be desirable to prevent processing elements that are not related to "join" operations from being allocated to the subpool in order to facilitate allocation of system resources to the "join" operation). Accordingly, as described herein, a set of processing element profile data for a set of processing elements may be compared to the set of processing element placement criteria. Based on the comparison, it may be determined that a first processing element is associated with a "join" operation, and a second processing element is associated with a "sort" operation. As described herein, it may be ascertained that the first processing element achieves the processing element placement criteria for the subpool of compute nodes (e.g., exclusive association with a "join" operation), and a placement arrangement may be determined to allocate the first processing element to the subpool of compute nodes. A runtime platform scheduler may facilitate establishment/migration of the first processing element on/to the subpool of compute nodes. Other methods of processing element host management are also possible.

In embodiments, the set of processing element profile data may be configured without modifying a streaming application source code at block 674. Generally, configuring may include setting-up, modifying, customizing, changing, or otherwise establishing the set of processing element profile data. Aspects of the disclosure relate to the recognition that, in certain situations, the streaming application source code for a particular streaming application may not be available or accessible when processing element placement arrangements are determined for a stream computing environment (e.g., the streaming application may be developed and used by different parties). Accordingly, aspects of the disclosure relate to facilitating configuration of the set of processing element profile data without use of the streaming application source code. In embodiments, modifying the set of processing element profile data may include altering one or more operator classifications that indicate what types of functions/ operations a particular processing element is associated with (e.g., affecting which compute nodes the processing element may be deployed to). As an example, the set of processing element profile data for a "custom" type processing element (e.g., operator whose function is defined by a user) may be modified to indicate that the processing element is associated with a "filter" operation. Other methods of configuring the set of processing element profile data without modifying streaming application source code are also possible.

In embodiments, the set of processing element placement criteria may be modified without modifying a streaming application source code at block 676. Generally, configuring may include setting-up, modifying, customizing, changing, or otherwise establishing the set of processing element placement criteria. As described herein, in certain embodiments it may be desirable to edit the set of processing element placement criteria to manage the processing elements that may be hosted by compute nodes without modifying source code for the streaming application. In embodiments, configuring the set of processing element placement criteria may include specifying additional placement criteria, removing/deleting placement criteria, or editing existing placement criteria. As an example, the placement criteria for a compute node that was configured to exclusively handle processing elements associated with "sort" operations may be modified to also accept placement of processing elements associated with "join" operations.

In response to configuring the set of processing element placement criteria, the placement arrangement may be redetermined at block 678. The placement arrangement may be redetermined in an automated fashion without user intervention. Generally, redetermining can include formulating, ascertaining, modifying, revising, or editing the placement arrangement. In embodiments, redetermining may include altering the placement arrangement based on the updated processing element placement criteria. In certain embodiments, redetermining may include comparing the processing element profile data for the set of processing elements to the updated processing element placement criteria, and devising a new placement arrangement for the set of processing elements. As described herein, the placement arrangement may be redetermined automatically (e.g., by a runtime platform scheduler) without manual input. Other methods of configuring the set of processing element placement criteria and redetermining the placement arrangement are also possible.

Method 600 concludes at block 699. Aspects of method 600 may provide performance or efficiency benefits for processing element host management in a stream computing environment. For example, aspects of method 600 may have positive impacts with respect to determining and establishing a placement arrangement for a set of processing elements on a pool of compute nodes based on a comparison between a set of processing element placement criteria and a set of processing element profile data. The identifying, the detecting, the determining, the establishing, and other steps described herein may each occur in an automated fashion without user invention. Altogether, leveraging processing element host management may be associated with benefits including data processing efficiency and stream application performance.

Figure 7:
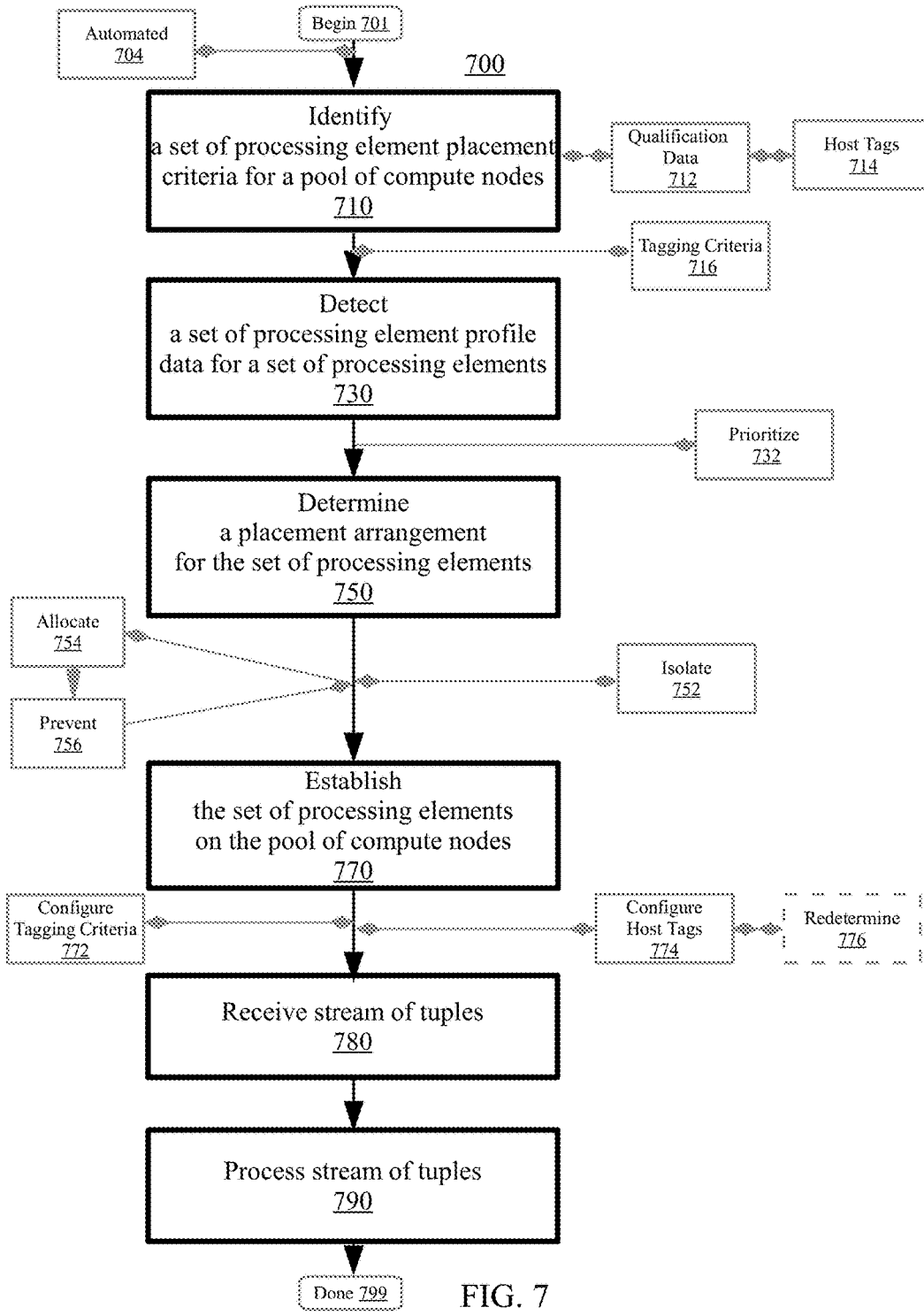
FIG. 7 is a flowchart illustrating an example method for processing element host management in a stream computing environment, according to embodiments.

FIG. 7 is a flowchart illustrating an example method 700 for processing element host management in a stream computing environment, according to embodiments. Aspects of method 700 relate to managing placement of a set of processing elements for a pool of compute nodes using a set of invitation-only host tags. Aspects of method 700 may substantially correspond to embodiments described herein and the FIGS. 1-9. The method 700 may begin at block 701. At block 710, a set of processing element placement criteria for a pool of compute nodes may be identified. At block 730, a set of processing element profile data for a set of processing elements may be detected. At block 750, a placement arrangement for the set of processing elements may be determined. At block 770, the set of processing elements may be established on the pool of compute nodes. Leveraging processing element host management may be associated with benefits including data processing efficiency and stream application performance.

In embodiments, the identifying, the detecting, the determining, the establishing, and other steps described herein may each occur in an automated fashion without user intervention (e.g., using automated computing machinery, fully machine-driven without manual stimuli) at block 704. In embodiments, the identifying, the detecting, the determining, the establishing, and other steps described herein may be carried out by an internal processing element host management module maintained in a persistent storage device of a computing node that hosts the streaming application containing the processing elements. In certain embodiments, the identifying, the detecting, the determining, the establishing, and other steps described herein may be carried out by an external processing element host management module (e.g., runtime platform scheduler) hosted by a remote computing device or server (e.g., accessible via a subscription, usage-based, or other service model). In this way, aspects of processing element host management in a stream computing environment may be performed using automated computing machinery without manual action. Other methods of performing the steps described herein are also possible.

In embodiments, the set of processing element placement criteria may include a set of processing element qualification data at block 712. Generally, the set of processing element qualification data can include computer specified instructions, commands, or other requirements that define qualifications or requirements for placement of the set of processing elements on one or more compute nodes. For example, the set of processing element qualification data may indicate specific processing element types that may or may not be allowed for placement on particular compute nodes of the pool of compute nodes (e.g., allow placement of functor type processing elements, don't allow processing elements that require memory resources above a threshold level of 4 gigabytes). In embodiments, the set of processing element qualification data may include a set of invitation-only host tags at block 714. The set of invitation-only host tags may include markers, labels, or other identifiers that specify one or more properties or attributes that must be included in the profile data of a processing element in order for the processing element to be placed on one or more compute nodes. As an example, the set of invitation-only host tags may designate that only processing elements having profile data that references a "sort" operation may be allocated to a particular compute node. Other types of processing element qualification data and invitation-only host tags are also possible.

In embodiments, the set of processing element profile data may include a set of tagging criteria at block 716. The set of tagging criteria may include a portion of the processing element profile data that defines one or more properties, attributes or characteristics of the processing elements that may be used in conjunction with the set of invitation-only host tags to determine the placement arrangement for the set of processing elements. In embodiments, the set of tagging criteria may be represented using a set of tags to indicate the function, operations, or other attributes associated with the set of processing elements. For instance, in certain embodiments, the set of invitation-only host tags may designate that only processing elements that include specific tags may be placed on a particular compute node. As an example, the set of invitation-only host tags may define that only processing elements that include "data ingest" tags may be placed on a first compute node of the pool of compute nodes. Other types of tagging criteria are also possible.

In embodiments, an assignment of a subset of the set of processing elements that have a set of tagging criteria which matches a target processing element type may be prioritized at block 732. The assignment of the subset of the set of processing elements may be prioritized to a subpool of the pool of compute nodes that corresponds to the set of invitation-only host tags. Generally, prioritizing can include arranging, organizing, ordering, or weighting the assignment of the subset of the set of processing elements. In embodiments, prioritizing may include favoring placement of a subset of processing elements that have a set of tagging criteria associated with the target processing element type on the pool of compute nodes (e.g., over processing elements associated with other processing element types). As an example, a first compute node may be have a set of invitation-only host tags that is based on a target processing element type of "format." Accordingly, a processing element that has tagging criteria that identifies the processing element as being associated with the "format" target processing element type may be prioritized for placement on the first compute node (e.g., the target processing element type of the invitation-only host tags matches that of the processing element). Other methods of prioritizing the assignment of a subset of the set of processing elements are also possible.

In embodiments, a subset of the set of processing elements that have a set of tagging criteria which matches the target processing element type may be isolated at block 752. The subset of the set of processing elements may be isolated on a subpool of the pool of compute nodes that corresponds to the set of invitation-only host tags. Generally, isolating can include separating, reserving, setting-aside, sequestering, or quarantining the subset of the set of processing nodes.

In embodiments, isolating may include configuring the subpool of compute nodes to only accept deployment of processing elements that have tagging criteria associated with the target processing element type, and facilitating placement of processing elements of the chosen type on the subpool of compute nodes. For instance, the invitation-only host tags may designate a target processing element type of "import." As such, a runtime platform scheduler may evaluate the set of processing element profile data for a set of processing elements, and ascertain a subset of processing elements that are marked with an "import" tag (e.g., tagging criteria that corresponds with the target processing element type). The subset of processing elements may then facilitate deployment of the subset of processing elements to the subpool of compute nodes. In embodiments, processing elements that are not associated with the target processing element type may be prevented from placement on the subpool of compute nodes. Other methods of isolating the assignment of a subset of the set of processing elements are also possible.

In embodiments, a first processing element of the set of processing elements may be allocated to a first compute node of the pool of compute nodes at block 754. The first processing element may be allocated to the first compute node only when a first tagging criterion of the set of tagging criteria matches a first invitation-only host tag of the set of invitation-only host tags. Generally, allocating can include assigning, placing, migrating, designating, or deploying the first processing element to the first compute node. As described herein, aspects of the disclosure relate to the recognition that, in certain embodiments, grouping those processing elements that share particular attributes (e.g., function, type, resource usage) on the same hosts may be associated with stream application performance and efficiency. Accordingly, in embodiments, only processing elements that have a particular tagging criterion that matches (e.g., corresponds with) an invitation-only host tag of a compute node may be placed on the pool of compute nodes. For instance, for a first compute node having a first invitation-only host tag of "pair operation," only those processing elements with a tagging criterion of "pair operation" may be allocated to the first compute node. As another example, for a second compute node having two invitation-only host tags of "split operation" and "order operation," only those processing elements that have both "split operation" and an "order operation" tagging criterion may be allocated to the second compute node. Other methods of allocating processing elements based on the invitation-only host elements and tagging criteria are also possible.

In embodiments, assignment of a second processing element of the set of processing elements to a second compute node of the pool of compute nodes may be prevented at block 756. Assignment of the second processing element to the second compute node may be prevented when a second tagging criterion of the set of tagging criteria mismatches a second invitation-only host tag of the set of invitation only host tags. Generally, preventing can include limiting, denying, forbidding, or restricting assignment of the second processing element to the second compute node. As described herein, in certain embodiments, it may be desirable to limit the processing elements that may be placed on certain compute nodes of the pool of compute nodes to those that have particular characteristics (e.g., to dedicate resources to a particular operation). In embodiments, preventing may include evaluating the tagging criteria of the second processing element with respect to the invitation-only host tags of the pool of compute nodes, and ascertaining that that one or more of the tagging criteria of the second processing element mismatches the second invitation-only host tag. As an example, for a compute node having an invitation-only host tag of "parse," a processing element with a tagging criterion of "sort" may be prevented from placement on the compute node. As another example, for a compute node having an invitation-only host tag of "join," a processing element with tagging criteria of "join" and "functor" may be prevented from placement on the compute node (e.g., extraneous criteria that do not match the invitation-only host tags may result in allocation prevention). Other methods of preventing assignment of the second processing element to the second compute node are also possible.

In embodiments, the set of tagging criteria may be configured without modifying a streaming application source code at block 772. Configuration of the set of tagging criteria may be performed when each invitation-only host tag of the set of invitation-only host tags matches at least one tagging criterion of the set of tagging criteria. Generally, configuring may include modifying, altering, revising, customizing, or otherwise changing the set of tagging criterion. In embodiments, configuring the set of tagging criteria may include adding, decreasing, or editing an existing tag of the set of tagging criteria that indicates an operation, function, or other characteristic of a processing element. Consider, for instance, that a first processing element having tagging criteria of "sort" and "join" is determined to match the invitation-only host tags of a first compute node, and is allocated to the first compute node. In embodiments, the first compute node may be configured to adapt the first processing element to perform a "filter" operation. Accordingly, a tag of "filter" may be added to the first processing element to indicate the updated characteristics of the first processing element. Other methods of configuring the set of tagging criteria are also possible.

In embodiments, the set of invitation-only host tags may be configured without modifying a streaming application source code at block 774. Configuration of the set of invitation-only host tags may be performed when each invitation-only host tag of the set of invitation-only host tags matches at least one tagging criterion of the set of invitation-only host criteria. Generally, configuring can include modifying, altering, revising, customizing, or otherwise changing the set of invitation-only host tags. In embodiments, configuring the set of processing element placement criteria may include specifying additional host tags, removing/deleting host tags, or editing existing host tags. As an example, the set of invitation-only host tags for a compute node that was configured to exclusively handle processing elements associated with "parse" operations may be modified to also accept placement of processing elements associated with "ingest" operations.

In response to configuring the set of invitation-only host tags, the placement arrangement may be redetermined at block 776. The placement arrangement may be redetermined in an automated fashion without user intervention. Generally, redetermining can include formulating, ascertaining, modifying, revising, or editing the placement arrangement. In embodiments, redetermining may include altering the placement arrangement based on the updated invitation-only host tags. In certain embodiments, redetermining may include comparing the tagging criteria for the set of processing elements to the updated invitation-only host tags, and devising a new placement arrangement for the set of processing elements. As described herein, the placement arrangement may be redetermined automatically (e.g., by a runtime platform scheduler) without manual input. Other methods of configuring the set of invitation-only host tags and redetermining the placement arrangement are also possible.

At block 780, a stream of tuples is received. The stream of tuples may be processed by a plurality of processing elements (e.g., stream operators) operating on a set of compute nodes (e.g., in a stream application environment). The stream of tuples may be received consistent with the description herein including FIGS. 1-9. Current/future processing by the plurality of processing elements may be performed consistent with the description herein including FIGS. 1-9. The set of compute nodes may include a shared pool of configurable computing resources. For example, the set of compute nodes can be a public cloud environment, a private cloud environment, or a hybrid cloud environment. In certain embodiments, each of the set of compute nodes are physically separate from one another.

In embodiments, the stream of tuples is processed at block 790. The stream of tuples may be processed by the plurality of processing elements operating on the set of compute nodes. The stream of tuples may be processed consistent with the description herein including FIGS. 1-9. In embodiments, stream operators operating on the set of compute nodes may be utilized to process the stream of tuples. Processing of the stream of tuples by the plurality of processing elements may provide various flexibilities for stream operator management. Overall flow (e.g., data flow) may be positively impacted by utilizing the stream operators.

Method 700 concludes at block 799. Aspects of method 700 may provide performance or efficiency benefits for processing element host management in a stream computing environment. For example, aspects of method 700 may have positive impacts with respect to determining and establishing a placement arrangement for a set of processing elements on a pool of compute nodes based on a comparison between a set of tagging criteria and a set of invitation-only host tags. The identifying, the detecting, the determining, the establishing, and other steps described herein may each occur in an automated fashion without user invention. Altogether, leveraging processing element host management may be associated with benefits including data processing efficiency and stream application performance.

Figure 8:
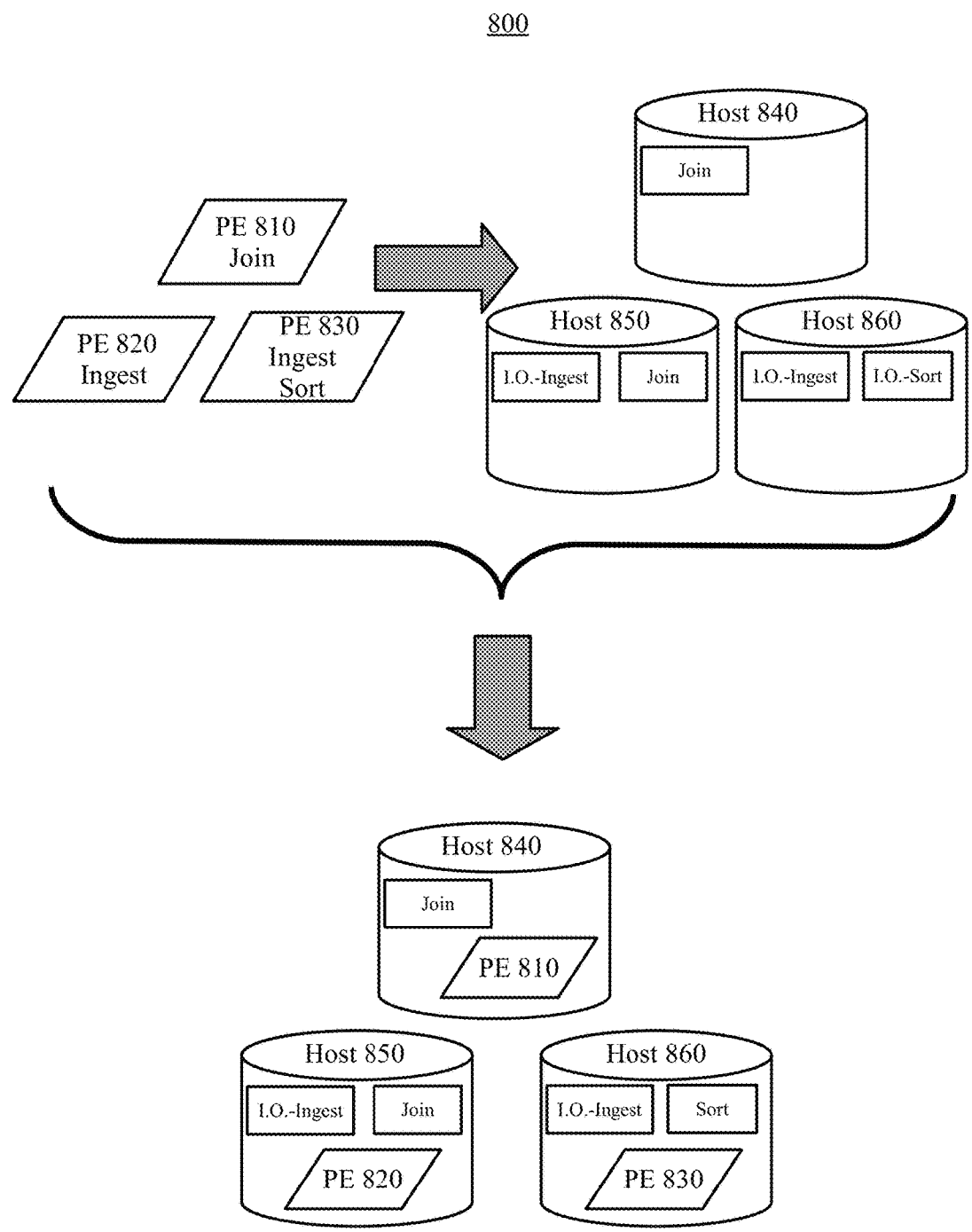
FIG. 8 is a diagram illustrating an example system for processing element host management in a stream computing environment, according to embodiments.

FIG. 8 is a diagram illustrating an example system/implementation 800 for processing element host management in a stream computing environment, according to embodiments. Aspects of the example configuration relate to using a set of placement criteria and a set of processing element profile data to determine a placement arrangement for a set of processing elements. Aspects of exemplary implementation 800 may substantially correspond to embodiments described herein and the FIGS. 1-9. The example implementation 800 may include a set of processing elements having a processing element 810, a processing element 820, and a processing element 830. The example implementation 800 may also include a pool of compute nodes having a Host 840, a Host 850, and a Host 860. Leveraging processing element host management may be associated with benefits including data processing efficiency and stream application performance.

In embodiments, a runtime platform scheduler may be configured to evaluate the pool of compute nodes and identify a set of processing element placement criteria. In embodiments, the set of processing criteria may be identified based on tags associated with the pool of compute nodes. For instance, the runtime platform scheduler may identify a set of placement criteria that indicates that Host 840 may be configured to freely receive processing elements (e.g., no restrictions/requirements), Host 850 may be configured to only receive processing elements associated with ingest operations (e.g., due to an invitation-only host tag for the ingest operation), and Host 860 may be configured to only receive processing elements associated with both ingest operations and sort operations. The runtime platform scheduler may also be configured to analyze the set of processing elements, and detect a set of processing element profile data that identifies properties, attributes, and characteristics of the set of processing elements. As an example, the set of processing element profile data may indicate that processing element 810 is associated with a join operation, processing element 820 is associated with an ingest operation, and processing element 830 is associated with both an ingest operation and a sort operation. Other types of placement criteria and processing element profile data are also possible.

In embodiments, the set of placement criteria may be compared with the set of processing element profile data to determine a placement arrangement for the set of processing elements on the set pool of compute nodes. For instance, the processing element profile data for the processing element 810 may be compared to the placement criteria for the pool of compute nodes, and it may be determined that, as the processing element 810 is not associated with an ingest operation, it may not achieve the placement criteria of the invitation-only host tag for either Host 850 or Host 860. In certain embodiments, it may be ascertained that processing element 810 achieves the placement criteria of Host 840 (e.g., as Host 840 does not include any invitation-only host tags), and the processing element 810 may be determined for placement on Host 840.

In embodiments, in response to comparing the placement criteria and the processing element profile data, it may be determined that processing element 820 achieves the placement criteria of both Host 840 (e.g., as Host 840 does not place any restrictions on processing elements) as well as Host 850 (e.g., as the processing element 820 is associated with an ingest operation, which achieves the placement criteria of the invitation-only host tag of Host 850), but does not achieve the placement criteria of Host 860 (e.g., as the processing element 820 is not associated with the sort operation required by the invitation-only host tag of Host 860). In certain embodiments, as described herein, aspects of the disclosure relate to prioritizing assignment of processing elements to host compute nodes that share a processing element type. Accordingly, in embodiments, as processing element 820 and Host 860 share a processing element type of "ingest," the processing element 820 may be determined for placement on Host 850.

In embodiments, in response to comparing the placement criteria and the processing element profile data, it may be determined that processing element 830 achieves the placement criteria of Host 840 (e.g., as the Host 840 does not place any restrictions on processing elements), Host 850 (e.g., e.g., as the processing element 830 is associated with an ingest operation, which achieves the placement criteria of the invitation-only host tag of Host 850), as well as Host 860 (e.g., processing element 830 achieves the placement criteria specified by both invitation-only host tags of Host 860). In embodiments, aspects of the disclosure relate to evaluating the processing element profile data with respect to the placement criteria of one or more hosts, and assigning a compatibility score to the processing element based on the degree or extent to which the processing element corresponds to each host compute node of the pool of compute nodes. The placement arrangement for the processing element may be determined based on the compatibility score of the processing element with respect to the pool of compute nodes. As an example, the runtime platform scheduler may analyze the profile data of the processing element 830 with respect to the pool of compute nodes, and ascertain a compatibility score for the processing element 830 of 45 with respect to Host 840 (e.g., the placement criteria are achieved, but processing element 830 does not share any processing element types with Host 840), a compatibility score of 62 with respect to Host 850 (e.g., processing element 830 and Host 850 share one processing element type of "ingest"), and a compatibility score of 80 with respect to Host 860 (e.g., processing element 830 shares two processing element types of "ingest" and sort). As such, in certain embodiments, the processing element 830 may be determined for placement on Host 860 (e.g., as the compatibility score of the processing element 830 was highest with respect to Host 860). Other methods of determining the placement arrangement are also possible.

FIG. 9 is a diagram illustrating an example system/implementation 900 for processing element host management in a stream computing environment, according to embodiments. Aspects of the example implementation 900 relate to using a set of placement criteria and a host system configuration to determine a placement arrangement for a set of processing elements. Aspects of the example implementation 900 relate to the recognition that, in embodiments, the set of placement criteria may be associated with the set of processing elements (e.g., rather than/in addition to the pool of compute nodes.) Aspects of exemplary implementation 900 may substantially correspond to embodiments described herein and the FIGS. 1-9. The exemplary implementation 900 may include a Table 910 illustrating the set of placement criteria, a Table 930 illustrating a set of tag identifiers and tag types, a Table 950 illustrating a candidate pool of host compute nodes, and a table 970 illustrating an example placement arrangement. Leveraging processing element host management may be associated with benefits including data processing efficiency and stream application performance.

In embodiments, Table 910 may specify a set of placement criteria. As described herein, the set of placement criteria may be associated with a set of processing elements, and define requirements, prerequisites, stipulations, and other factors that specify the compute nodes on which the set of processing elements may be placed. The set of placement criteria may be detected by a scheduler (e.g., runtime platform scheduler). As shown in Table 910, the set of placement criteria may specify that a first processing element may not have any placement criteria, a second processing element must be placed on a host with a red tag, and a third processing element may be placed on a host having both red and blue tags. In embodiments, the "red," "blue," "white," and other tags described herein may be used solely for the purpose of illustration, and serve as placeholders for one or more other attributes (e.g., processing element type, function, resource usage, security properties). Other types of placement criteria are also possible.

In embodiments, Table 930 may illustrate a set of tag identifiers and tag types. The tag types may indicate one or more characteristics or properties of the set of tags. In embodiments, aspects of the disclosure relate to a set of tags including one or more of a regular tag type or an invitation-only tag type. In embodiments, a regular tag-type may specify a one-way, inclusive relationship with respect to the processing elements, such that processing elements may be freely placed on hosts with regular-type tags even if the processing elements are associated with other tag types (e.g., a processing element having a white tag may still be placed on a host having a red tag, provided placement criteria for the processing element do not specify otherwise). In embodiments, aspects of the disclosure relate to an invitation-only tag type that specifies a two-way exclusive relationship with respect to the processing elements, such that only processing elements that share a tag (e.g., function, type, operation) with a potential host compute node may be placed on the host compute node. For instance, consistent with the example described herein, an invitation-only host tag may designate that a both a processing element and a host compute node must be associated with a "blue" tag in order for the processing element to be placed on the host compute node.

In embodiments, Table 950 may illustrate a candidate pool of host compute nodes. As shown in FIG. 9, the candidate pool of host compute nodes may include a Host A, Host B, Host C, and Host D. In embodiments, one or more compute nodes of the pool of host compute nodes may be associated with one or more tags. For instance, Host A may be associated with a "red" tag, Host B may be associated with both "red" and "blue" tags, Host C may be associated with "red," "white," and "blue" tags, and Host D may not be associated with any tags. As described herein, the tags for each Host may be used together with the placement criteria specified in Table 910 to determine a placement arrangement for a set of processing elements.

In embodiments, Table 970 may illustrate an example placement arrangement of the processing elements for the set of host compute nodes. As described herein, the placement arrangement may be determined based on a comparison between the placement criteria of the processing elements (e.g., shown in Table 910) and the host configuration of the host compute nodes (e.g., shown in Table 950). In embodiments, a runtime platform scheduler may compare the placement criteria for each of the processing elements with the host configuration of the host compute nodes, and ascertain which processing elements may be placed on which host compute nodes. For instance, as the first processing element does not include any placement criteria, it may be determined that both Host A and Host D are potential hosts for the first processing element (e.g., as the first processing element does not include the invitation-only blue tag, it may not be placed on Host B or Host C). The second processing element may include a placement criterion specifying that it must be placed on a host with a "red" tag, and so it may be ascertained that Host A is a potential host for the second processing element (e.g., lack of the invitation-only blue tag may prevent placement on Hosts B and C, and Host D's lack of a red tag may conflict with the second processing element's placement criteria). The third processing element may have placement criteria specifying that it must be placed on hosts having both "red" and "blue" tags. Accordingly, the runtime platform scheduler may determine that Hosts B and C achieve these placement criteria, and identify Hosts B and C as potential hosts for the third processing element. Other placement arrangements are also possible.

In addition to embodiments described above, other embodiments having fewer operational steps, more operational steps, or different operational steps are contemplated. Also, some embodiments may perform some or all of the above operational steps in a different order. In embodiments, operational steps may be performed in response to other operational steps. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for processing element host management in a stream computing environment having a pool of compute nodes to host a set of processing elements, the method comprising:
   in response to analyzing a pool of compute nodes, receiving a set of processing element placement criteria associated with a processing element placement on the analyzed pool of compute nodes;
   identifying, in the received set of processing element placement criteria, a set of invitation-only host tags in a subpool of the pool of compute nodes;
   determining, based on the identified set of invitation-only host tags of the subpool of the pool of compute nodes, a pre-requisite indicated by a respective compute node for the processing element placement on the respective compute node, wherein the determined pre-requisite designates a target processing element type as being eligible for the processing element placement on the respective compute node;
   detecting, for a set of processing elements with respect to the processing element placement on the pool of compute nodes, a set of processing element profile data, wherein the detected set of processing element profile data includes a set of tagging criteria;
   determining a placement arrangement for the set of processing elements on the pool of compute nodes by comparing the set of tagging criteria of the set of processing elements and the received set of processing element placement criteria of the pool of compute nodes;
   in response to identifying a subset of the set of processing elements that have the set of tagging criteria which matches the identified set of invitation-only host tags of the subpool of the pool of compute nodes, prioritizing an assignment of the identified subset of the set of processing elements to the subpool of the pool of compute nodes;
   isolating, on the subpool of the pool of compute nodes including to the identified set of invitation-only host tags, the prioritized assignment of the identified subset of the set of processing elements that have the set of tagging criteria which matches the identified set of invitation-only host tags; and
   establishing, based on the determined placement arrangement, the set of processing elements on the pool of compute nodes.

2. The method of claim 1, further comprising:
   resolving that a first subset of the set of processing element profile data for a first processing element of the set of processing elements does not achieve a first subset of the set of processing element placement criteria for a first compute node of the pool of compute nodes; and
   preventing assignment of the first processing element to the first compute node.

3. The method of claim 2, further comprising:
resolving that the first subset of the set of processing element profile data for the first processing element of the set of processing elements achieves a second subset of the set of processing element placement criteria for a second compute node of the pool of compute nodes; and
allocating the first processing element to the second compute node.

4. The method of claim 1, further comprising:
resolving that a first subset of the set of processing element profile data for a first processing element of the set of processing elements achieves a first subset of the set of processing element placement criteria for a first compute node of the pool of compute nodes; and
allocating the first processing element to the first compute node.

5. The method of claim 1, further comprising:
configuring, without modifying a streaming application source code, the set of processing element profile data.

6. The method of claim 1, further comprising:
configuring, without modifying a streaming application source code, the set of processing element placement criteria.

7. The method of claim 6, further comprising:
redetermining, in an automated fashion without user intervention, the placement arrangement in response to configuring the set of processing element placement criteria.

8. The method of claim 1, further comprising:
allocating a first processing element of the set of processing elements to a first compute node of the pool of compute nodes only when a first tagging criterion of the set of tagging criteria matches a first invitation-only host tag of the set of invitation-only host tags; and
preventing assignment of a second processing element of the set of processing elements to a second compute node of the pool of compute nodes when a second tagging criterion of the set of tagging criteria mismatches a second invitation-only host tag of the set of invitation-only host tags.

9. The method of claim 1, wherein each invitation-only host tag of the set of invitation-only host tags matches at least one tagging criterion of the set of tagging criteria, and further comprising:
configuring, without modifying a streaming application source code, the set of tagging criteria.

10. The method of claim 1, wherein each invitation-only host tag of the set of invitation-only host tags matches at least one tagging criterion of the set of tagging criteria, and further comprising:
configuring, without modifying a streaming application source code, the set of invitation-only host tags.

11. The method of claim 10, further comprising:
redetermining, in an automated fashion without user intervention, the placement arrangement in response to configuring the set of invitation-only host tags.

12. The method of claim 1, wherein the identifying, the detecting, the determining, the prioritizing, the isolating, and the establishing each occur in an automated fashion without user intervention.

13. The method of claim 1, further comprising:
receiving a stream of tuples to be processed by the set of processing elements operating on the pool of compute nodes; and
processing, using the set of processing elements operating on the pool of compute nodes, the stream of tuples.

14. A system for processing element host management in a stream computing environment having a pool of compute nodes to host a set of processing elements, the system comprising:
a memory having a set of computer readable computer instructions, and a processor for executing the set of computer readable instructions, the set of computer readable instructions including:
in response to analyzing a pool of compute nodes, receiving a set of processing element placement criteria associated with a processing element placement on the analyzed pool of compute nodes;
identifying, in the received set of processing element placement criteria, a set of invitation-only host tags in a subpool of the pool of compute nodes;
determining, based on the identified set of invitation-only host tags of the subpool of the pool of compute nodes, a pre-requisite indicated by a respective compute node for the processing element placement on the respective compute node, wherein the determined pre-requisite designates a target processing element type as being eligible for the processing element placement on the respective compute node;
detecting, for a set of processing elements with respect to the processing element placement on the pool of compute nodes, a set of processing element profile data, wherein the detected set of processing element profile data includes a set of tagging criteria;
determining a placement arrangement for the set of processing elements on the pool of compute nodes by comparing the set of tagging criteria of the set of processing elements and the received set of processing element placement criteria of the pool of compute nodes;
in response to identifying a subset of the set of processing elements that have the set of tagging criteria which matches the identified set of invitation-only host tags of the subpool of the pool of compute nodes, prioritizing an assignment of the identified subset of the set of processing elements to the subpool of the pool of compute nodes;
isolating, on the subpool of the pool of compute nodes including the identified set of invitation-only host tags, the prioritized assignment of the identified subset of the set of processing elements that have the set of tagging criteria which matches the identified set of invitation-only host tags; and
establishing, based on the determined placement arrangement, the set of processing elements on the pool of compute nodes.

15. A computer program product for processing element host management in a stream computing environment having a pool of compute nodes to host a set of processing elements, the computer program product comprising a computer readable storage medium having program instructions embodied therewith, wherein the computer readable storage medium is not a transitory signal per se, the program instructions executable by a processor to cause the processor to perform a method comprising:
in response to analyzing a pool of compute nodes, receiving a set of processing element placement criteria associated with a processing element placement on the analyzed pool of compute nodes;
identifying, in the received set of processing element placement criteria, a set of invitation-only host tags in a subpool of the pool of compute nodes;

determining, based on the identified set of invitation-only host tags of the subpool of the pool of compute nodes, a pre-requisite indicated by a respective compute node for the processing element placement on the respective compute node, wherein the determined pre-requisite designates a target processing element type as being eligible for the processing element placement on the respective compute node;

detecting, for a set of processing elements with respect to the processing element placement on the pool of compute nodes, a set of processing element profile data, wherein the detected set of processing element profile data includes a set of tagging criteria;

determining a placement arrangement for the set of processing elements on the pool of compute nodes by comparing the set of tagging criteria of the set of processing elements and the received set of processing element placement criteria of the pool of compute nodes;

in response to identifying a subset of the set of processing elements that have the set of tagging criteria which matches the identified set of invitation-only host tags of the subpool of the pool of compute nodes, prioritizing an assignment of the identified subset of the set of processing elements to the subpool of the pool of compute nodes;

isolating, on the subpool of the pool of compute nodes including the identified set of invitation-only host tags, the prioritized assignment of the identified subset of the set of processing elements that have the set of tagging criteria which matches the identified set of invitation-only host tags; and establishing, based on the determined placement arrangement, the set of processing elements on the pool of compute nodes.

16. The computer program product of claim 15, wherein at least one of:

the program instructions are stored in the computer readable storage medium in a data processing system, and wherein the program instructions were downloaded over a network from a remote data processing system; or the program instructions are stored in the computer readable storage medium in a server data processing system, and wherein the program instructions are downloaded over a network to a remote data processing system for use in a second computer readable storage medium with the remote data processing system.

* * * * *